March 3, 1936. F. BLEY 2,032,395
ABRASIVE SAW
Filed Oct. 15, 1934     2 Sheets-Sheet 1
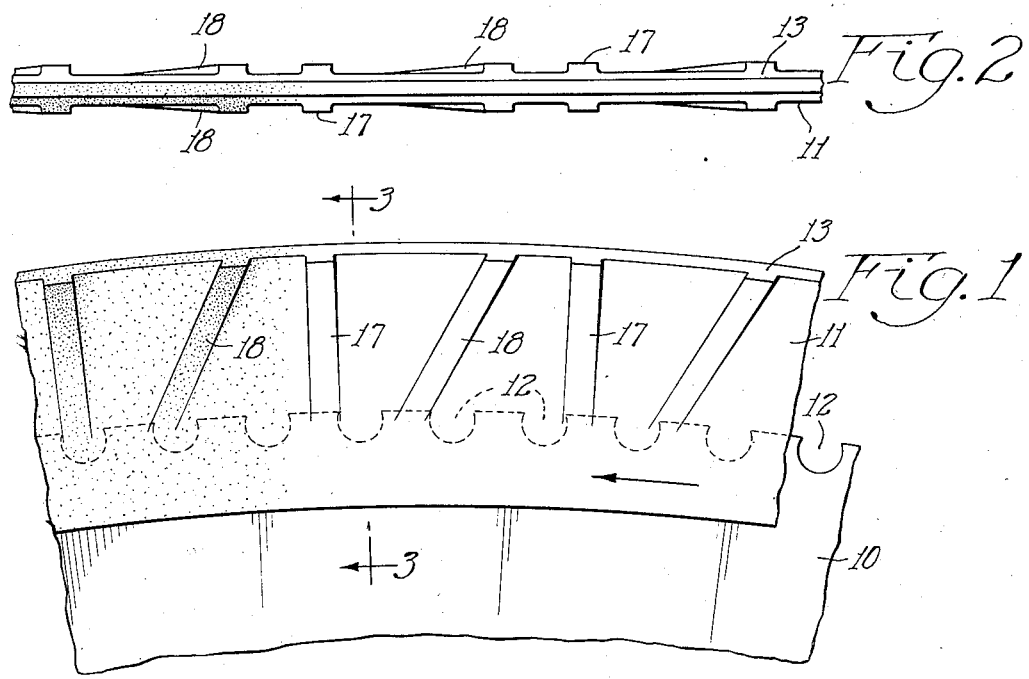
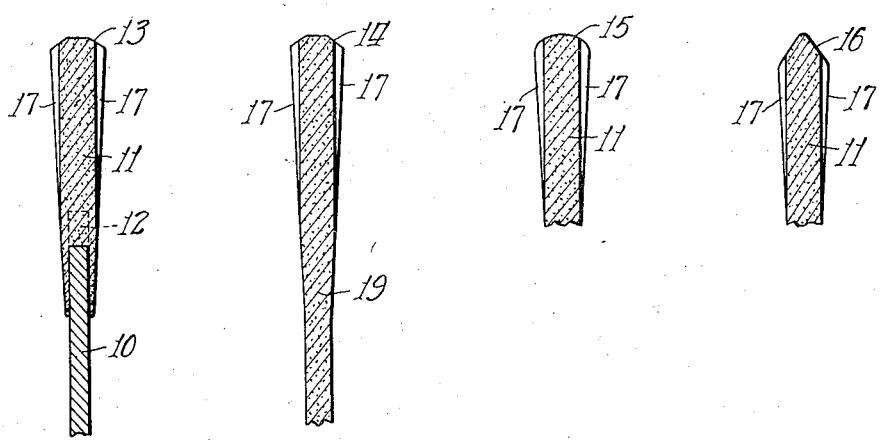
Inventor
Fred Bley
By: Hill and Hill
Attys.

March 3, 1936.  F. BLEY  2,032,395
ABRASIVE SAW
Filed Oct. 15, 1934   2 Sheets-Sheet 2
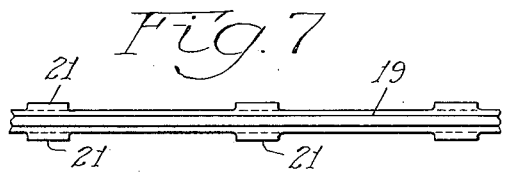
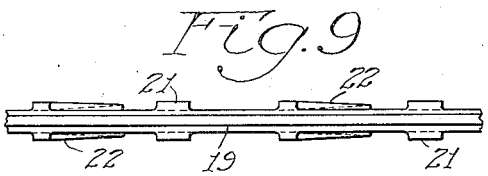
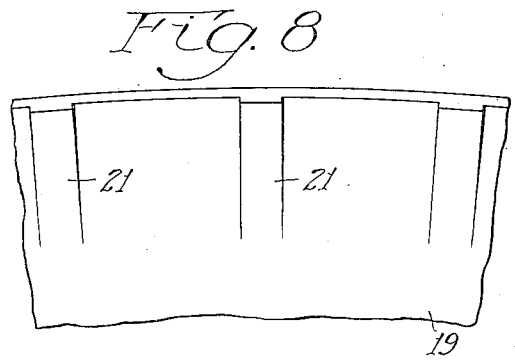
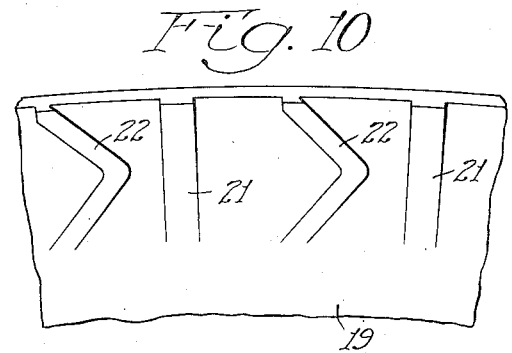
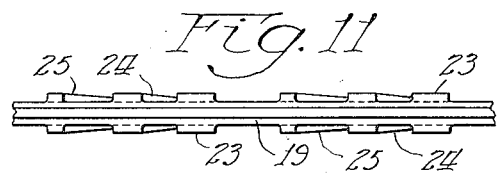
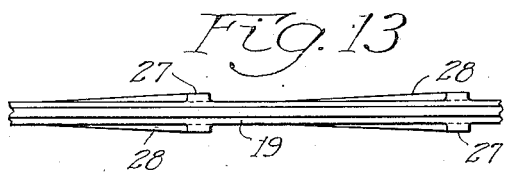
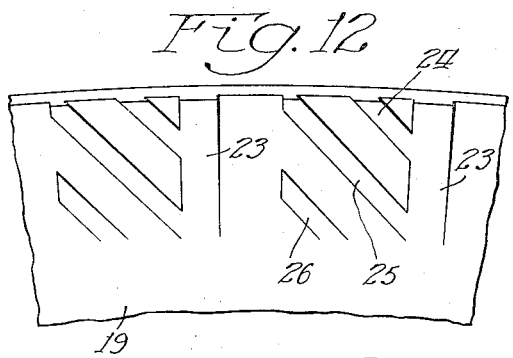
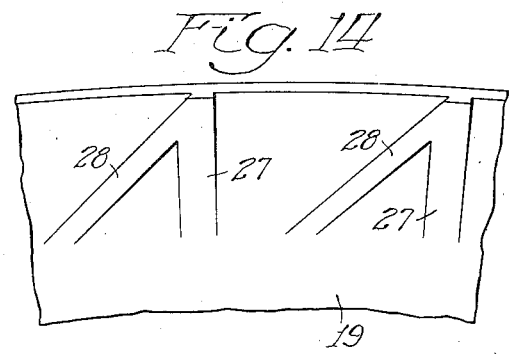
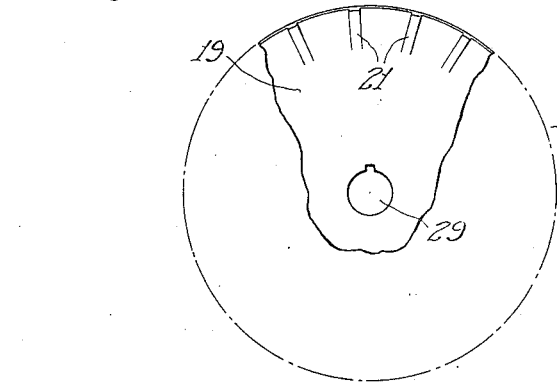
Inventor
Fred Bley
By: Hill and Hill
Attys.

Patented Mar. 3, 1936

2,032,395

UNITED STATES PATENT OFFICE 2,032,395

ABRASIVE SAW

Fred Bley, Chicago, Ill., assignor of one-half to Martin Hoerer, Chicago, Ill.

Application October 15, 1934, Serial No. 748,304

6 Claims. (Cl. 125—13)

My invention relates to saws and more particularly it relates to saws having their work engaging portions constructed of abrasive material in a manner such that severance of the work is accomplished by abrasive contact of the saw therewith.

It is an object of the invention to provide improved details of construction resulting in diminished frictional resistance and correspondingly increased efficiency of operation of a saw constructed in accordance therewith.

Rotatable saws embodying the principles of the invention are especially adapted for use with stone wherein contact of its side faces with the bounding walls of the groove formed in the stone during the severing operation provides a frictional resistance proportionate to the contacting areas. While the invention is adapted for use with either reciprocally movable or rotating disc saws, the latter are most frequently used in stone cutting and are operated at a relatively high speed wherein such frictional resistance is especially noticeable as tending to lower the efficiency of operation by slowing up the speed for a given amount of power or by requiring more power for operation at a given speed and another object of the invention is the provision of an improved abrasive saw so constructed that only a relatively small portion of the side faces frictionally contact with the side walls of the groove formed in the stone or other material being severed and the spaces between the contacting portions provide channels through which the sludge or pulverized material may escape freely without adding to the frictional resistance.

Still another object of the invention is the improvement of saws of the kind described providing details of construction which increase their efficiency by reducing the amount of power required for the accomplishment of a given amount of work.

A further object of the invention is the provision of an improved saw having its cutting edge formed on a body of abrasive material providing lateral projections so constructed and arranged that the main body of the saw, including said cutting edge, will not contact with the adjacent side walls of the partially severed work.

A further object of the invention is the provision of abrasive saws of the kind described which are adapted to be manufactured at low cost and are generally satisfactory for their intended purpose.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a side elevational view of a fragmentary portion of one form of a circular saw embodying the principles of the invention;

Fig. 2 is a view of the outer peripheral bounding edge of the construction shown in Fig. 1;

Fig. 3 is a sectional view along the line 3—3 of Fig. 1;

Figs. 4, 5 and 6 are views corresponding to Fig. 3, illustrating slightly modified forms of the outer peripheral bounding edge of the construction shown in Figs. 1, 8, 10, 12 and 14;

Figs. 8, 10, 12 and 14 are views of fragmentary portions of modified forms of saw discs each embodying the principles of the invention;

Figs. 7, 9, 11 and 13 are respective views of the bounding peripheral edges of the constructions shown in Figs. 8, 10, 12 and 14; and Fig. 15 is a diagrammatic view of a disc saw showing fragmentarily the relative positions and arrangements of lateral projections formed on the side walls and embodying the principles of the invention.

Referring now more particularly to Fig. 1 of the drawings, wherein one form of the invention is illustrated as embodied in a rotatable saw, the numeral 10 generally designates a metallic disc encircled by an annular rim 11 of abrasive material. Only fragmentary portions of the disc and rim are shown in Fig. 1, it being understood that the entire disc and rim are of the same construction as that shown and that the disc is provided with a central aperture similar to the aperture 29 shown in Fig. 15 to provide means for mounting a saw on a shaft. The disc 11 is preferably formed by molding from any suitable abrasive material, for example, silicate carbide, the material used being characterized by its becoming rigid and hard upon setting and possessing abrasive qualities adapted for severing the work with which it contacts.

The main body of the rim 11 is preferably of a uniform thickness greater than the thickness of the disc 10 with the rim projecting, as shown, over the adjacent faces of the disc, such projecting faces being convergent inwardly towards the disc. The edge of the disc 10 is provided with a plurality of recesses 12 preferably bounded by walls slightly convergent towards the peripheral edge of the disc, the recesses being filled with abrasive material in the process of molding the rim in place. The material contained in the recesses 12 prevents rotation of the rim 11 relative to the disc 10 and eliminates the possibility of the rim being detached from the disc by centrifugal force in the event it should be cracked or broken during operation of the saw.

The rim 11 is provided on each side with correspondingly spaced apart integrally formed lateral projections 17 and 18 arranged as shown. The outer peripheral edge of the rim 11 is bounded by upwardly convergent faces providing an initial cutting surface 13. The shape of the cutting surface may be varied to take the form of the surfaces 14, 15 and 16, respectively shown in Figs. 4, 5 and 6 or of any other suitable cutting surface convergent outwardly towards the median circumferential line. The projections 17 and 18 have their maximum thickness at their outer ends and converge inwardly towards the body of the rim 11. The outer ends of the projections 17 and 18 are bounded by extensions of the adjacent faces forming the cutting surface of the rim. The cutting surface of saws constructed as described will wear away by abrasive contact with the work and gradually recede inwardly and the groove formed in the work will have a width determined by the maximum thickness of the projections.

Obviously, neither the disc 10, the main body of the rim 11 nor the inner portions of the projections 17 and 18, will contact with the side walls of the groove thus formed and frictional contact with such walls will be substantially if not entirely eliminated. The bounding surfaces of the grooves formed in the work will be made perfectly smooth by constructing the lateral projections so that their thicknesses are all equal at equal distances from the center of the disc. The convergence inwardly of the side faces of the projections also permits water to flow freely through the partially formed groove and the spaces between contiguous projections provide outlets for sludge and other waste material resulting from the severing operation.

Fig. 4 illustrates a fragmentary section along a radial line of an integrally formed disc 19, also indicated diagrammatically in Fig. 15. The disc 19 may be constructed by molding abrasive material of the character previously described and has an aperture 29 at its center adapting it to be mounted upon a rotatable shaft. The center portion of the disc 19 is preferably of uniform thickness, the disc tapering outwardly as shown to connect the center portion with an outer annular portion of uniform but greater thickness than the inner portion. The outer peripheral edge of the disc 19 is constructed to provide any one of the initial cutting surfaces shown in Figs. 3 to 6, inclusive, and is provided with lateral projections 17 and 18 similar to those shown in Fig. 1. Obviously, the disc 19, constructed as described, is operable to sever material with a minimum of frictional contact with the side walls of the partially severed work and has all the other advantages enumerated for the metal disc and abrasive rim construction shown in Fig. 1.

Fig. 8 shows the disc 19 as provided with a plurality of spaced apart radially extending lateral projections 21 convergent inwardly toward the body of the disc and terminating substantially at the circumferential line bounding the inner portion of the thick annular section of the disc body.

Fig. 10 is another modification of an integral disc formed from abrasive material and is similar to the construction shown in Fig. 8 but differs therefrom in having V-shaped lateral projections 22 alternately positioned between the projections 21. The projections 22 preferably terminate at the same circumferential line as the projections 21 and the side walls of the projections 22 taper inwardly in such a manner that the projections 21 and 22 are of the same thickness at equal distances from the center line of the disc.

Fig. 12 is a view of a fragmentary portion of the disc 19 constructed as above described for Figs. 8 and 10 but differs therefrom in being provided with a plurality of spaced apart radially extending lateral projections 23 terminating in a cutting surface and converging inwardly in the same manner as the projections 21. Radially spaced apart projections 24, 25 and 26 are formed between the various projections 21. The outer projections 24 and the intermediate projections 25 are connected at their inner ends with the adjacent projections 23 and have their outer ends bounded by the initial peripheral cutting surface. The innermost projections 26 have their upper ends terminating in the same radial lines that mark the boundaries of a portion of the outer end of the corresponding projections 25. The inner ends of the projections 26 terminate in circumferential alignment with the inner ends of the projections 27 at the line defining the boundary of the annular relatively thick portion of the disc. The projections 23, 24, 25 and 26 all converge inwardly toward the body of the disc in such a manner that they are all of equal thickness at points equi-distant from the center of the disc.

Fig. 14 is a view of a fragmentary portion of the disc 19, the body of the disc being similar to those shown in Figs. 8, 10 and 12. In this embodiment of the invention, the disc 19 is provided with a plurality of radially extending spaced apart lateral projections 27 having their outer ends terminating in the initial cutting surface, and extending inwardly the full width of the relatively thick annular portion of the disc. A lateral projection 28 connected at its inner end with each of the projections adjacent the cutting surface, extends outwardly and diverges from the projection 27 at a substantial angle with its inner end terminating in circumferential alignment with the inner end of the projection 27. The projections 27 and 28 converge inwardly towards the body of the disc 19 in such a manner that they are of equal thickness at equal distances from the center of the disc. It is to be understood that the various forms of lateral projections respectively described in connection with the integral disc construction and with the construction providing a metallic disc bounded by an abrasive rim, are modified forms of the same invention and that those projections, described and shown only with the integral disc, are equally adapted for use with the abrasive rim construction and vice versa.

Thus it will be seen that I have provided an improved abrasive saw adapted to minimize the frictional contact of its side faces with the work to be severed with the result that the power required for accomplishing a given amount of work is correspondingly diminished.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

1. An abrasive saw comprising a body of substantially uniform thickness having one edge bounded by oppositely convergent faces providing a cutting surface, the portion of the body adjacent said cutting surface comprising abrasive material and providing a plurality of spaced apart lateral projections terminating in said cutting surface, the side faces of said projections being similarly convergent away from said cutting surface and towards the body of the saw.

2. An abrasive saw comprising a disc of substantially uniform thickness having its peripheral edge bounded by oppositely converging faces providing an initial cutting surface, the portion of the disc adjacent said cutting surface comprising abrasive material and providing on each side a plurality of spaced apart inwardly convergent lateral projections, said projections terminating in and each extending in a generally radial direction away from said cutting surface.

3. An abrasive saw comprising a disc of substantially uniform thickness having its peripheral edge bounded by oppositely converging faces providing an initial cutting surface, the portion of the disc adjacent said cutting surfaces comprising abrasive material and providing a plurality of spaced apart lateral projections on each side converging inwardly towards the body of the disc, said projections all being of the same thickness at equal distances from the center of the disc, certain of said projections having their side faces terminating in and the remainder stopping short of said cutting surface.

4. A saw of the kind described comprising a metallic disc, abrasive material arranged to form an annular rim encircling the disc, the outer peripheral edge of said rim being bounded by oppositely convergent faces providing a cutting surface, said rim providing a plurality of spaced apart lateral projections on each side and terminating in said cutting surface, the side faces of said projections being equally convergent away from the cutting surface and terminating in the body portion of said rim adjacent its juncture with said disc.

5. A saw of the kind described comprising a metallic disc, abrasive material arranged to form an annular rim encircling the disc, means adapted to prevent movement of the rim relative to the disc, the outer peripheral edge of said rim being bounded by oppositely convergent faces providing a cutting surface, said rim providing a plurality of spaced apart lateral projections on each side and terminating in said cutting surface, the side faces of said projections being convergent away from the cutting surface and towards the body of said rim and of the same thickness at equal distances from the center of the disc.

6. A saw of the kind described comprising a metallic disc, abrasive material arranged to form an annular rim encircling the disc, means adapted to prevent movement of the rim relative to the disc, the outer peripheral edge of said rim being bounded by oppositely convergent faces providing a cutting surface, both sides of said rim providing a plurality of spaced apart lateral projections having their side faces converging inwardly towards the body of the rim, certain of said projections terminating in said cutting surface, other of said projections having their outer terminus adjacent the cutting surface and their inner terminus adjacent the juncture of the rim with said disc and all of said projections being of the same thickness at equal distances from the center of the disc.

FRED BLEY.